Feb. 21, 1950 L. C. POOLE 2,497,909

REGISTER REGULATOR FOR PRINTING PRESSES

Filed Dec. 10, 1946 5 Sheets-Sheet 1

WITNESSES:

INVENTOR
Lloyd C. Poole.
BY
ATTORNEY

Feb. 21, 1950 L. C. POOLE 2,497,909

REGISTER REGULATOR FOR PRINTING PRESSES

Filed Dec. 10, 1946 5 Sheets-Sheet 2

INVENTOR
Lloyd C. Poole.
BY
ATTORNEY

Feb. 21, 1950 L. C. POOLE 2,497,909

REGISTER REGULATOR FOR PRINTING PRESSES

Filed Dec. 10, 1946 5 Sheets-Sheet 3

WITNESSES:
E. A. McCloskey.
Wm. C. Groome

INVENTOR
Lloyd C. Poole.
BY
Carl W. Avery
ATTORNEY

Feb. 21, 1950 L. C. POOLE 2,497,909

REGISTER REGULATOR FOR PRINTING PRESSES

Filed Dec. 10, 1946 5 Sheets-Sheet 4

WITNESSES:
E. A. McClaskey
Wm. L. Groome

INVENTOR
Lloyd C. Poole.
BY
[signature]
ATTORNEY

Feb. 21, 1950 L. C. POOLE 2,497,909

REGISTER REGULATOR FOR PRINTING PRESSES

Filed Dec. 10, 1946 5 Sheets-Sheet 5

WITNESSES:

E. A. McCloskey

[signature]

INVENTOR

Lloyd C. Poole.

BY

[signature]

ATTORNEY

Patented Feb. 21, 1950

2,497,909

UNITED STATES PATENT OFFICE 2,497,909

REGISTER REGULATOR FOR PRINTING PRESSES

Lloyd C. Poole, Lakewood, Ohio, assignor to Westinghouse Electric Corporation, East Pittsburgh, Pa., a corporation of Pennsylvania Application December 10, 1946, Serial No. 715,239

13 Claims. (Cl. 101—181)

My invention relates to register regulators for multi-color printing presses and, more particularly, to regulators for controlling the longitudinal register of multi-color rotary presses.

It is an object of the invention to provide a register control capable of securing an accurate register between the differently colored prints with the aid of photo-electrically controlled devices that require a lesser number of photoelectric scanning means and associated electronic circuits than heretofore necessary in such control systems.

Another object of my invention is to provide a register control of the kind mentioned which is distinguished by a very rapid response of the register control motors to the occurrence of misregister thus affording a correspondingly great accuracy of register.

Still another object is to devise a multi-color register control system capable of visually indicating any occurrence of misregister as well as the direction of such misregister relative to the printing cylinder.

These and other objects of the invention, as well as the means provided by the invention for achieving them will be apparent from the embodiment exemplified in the drawings and described hereinafter.

The register regulator represented by the drawings is designed to automatically control the longitudinal register of the four imprints successively produced in a multi-color press operating on the four-color combination principle of yellow, red, blue and black. The four-color prints are produced in four corresponding printing stands arranged in the sequence of the just-mentioned component colors. Usually, another color (monotone) is printed on the side of the web opposite to that receiving the color print and, as a rule, is not registered with the color print. Such a monotone printing stand is also provided in the printing press according to Fig. 1 and precedes the color presses proper as regards the travel of the web.

Figure 1:
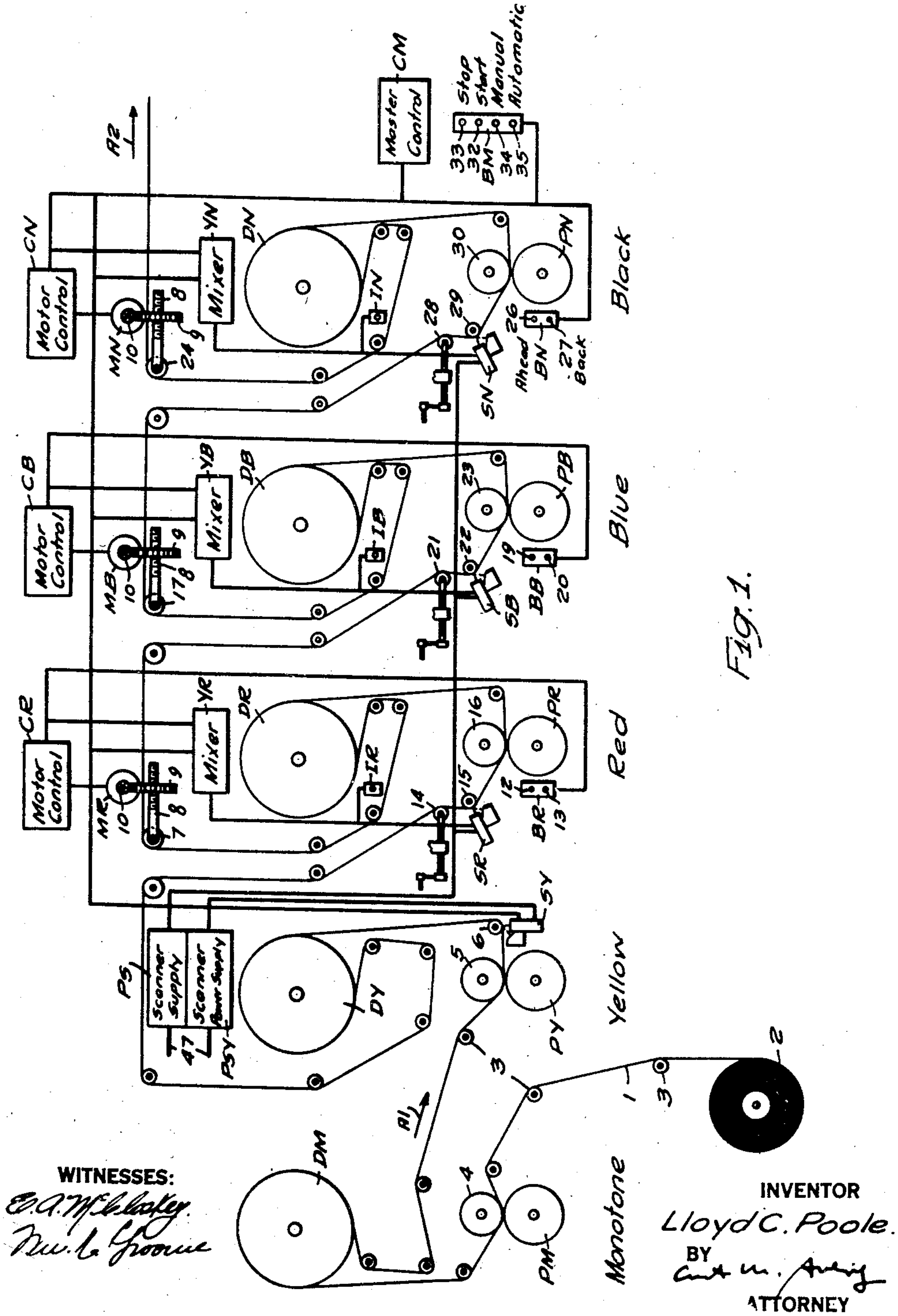
Figure 1 is a schematic illustration of a four-color printing press equipped with a register control in accordance with the invention.

According to Figure 1, the paper web 1 is taken from a supply reel 2 and passes over guide rollers, such as those denoted by 3, into the monotone printing stand, where it is held in contact with the monotone printing roll PM by the appertaining counter-roll 4. Thence, the paper passes over a steam-heated drier DM.

From the drier of the monotone printing stand, the web travels in the direction of the arrow A1 and in contact with guide rollers into the yellow printing stand, where it is held in contact with the yellow printing roll PY by the appertaining counter roll 5. The yellow printing roll PY prints equally spaced register marks, for instance dots, alongside the yellow imprint. As the paper leaves the roll PY, it passes over a roller 6 in proximity to a photo-electric scanner SY whose optical system is focused on the series of register marks so that a series of corresponding electric impulses is issued by the scanner. From the scanner, the web passes over a heated drying cylinder DY and thence over guide rollers into the red printing stand.

Thus traveling, the web passes over a compensating roller 7 which is journalled in a carrier 8. This carrier has a threaded portion in engagement with a revolvable nut 9 which has an exterior gearing in engagement with a worm 10 on the shaft of a register control motor MR. This motor is reversible and is controlled by a motor control unit CR to shift the compensating roller 7 horizontally in one or the other direction in order to shorten or lengthen the loop of web material between the yellow and red printing stands, for the purpose of maintaining the red imprint in register with the yellow imprint. The motor control unit CR is controlled by an electronic "mixer" unit denoted by YR which is connected to the scanner SY of the yellow printing stand and also to a scanner SR in the red printing stand. The motor control unit CR is also equipped with a manually actuable control (push button station) BR which has a push button 12 for causing the motor to move the red imprint ahead and another push button 13 for moving the imprint back. The red printing stand is further provided with an indicating device IR which is electrically connected with the mixer YR and exhibits a visual indication of any misregister and distinguishes between the forward or backward direction of such misregister. From the compensating roller 7, the web passes over a manually adjustable roller 14 to a roller 15 appertaining to a photo-electric scanner SR which has its optical system focused onto the series of register marks printed on the web by the yellow printing roll PY. The web then passes along the red printing roll PR and is held in proper engagement therewith by the counter roll 16. After leaving the printing roll PR, the web passes over a drier DR toward the blue printing stand.

Along its further travel, the web engages a compensating roller 17 which is adjustable by a reversible motor MB under control by a control unit CB substantially in the same manner as the compensating roll 7 above referred to. The motor control system CB is, in turn, controlled by a mixer YB in response to the occurrence of misregister detected by the yellow scanner SY in conjunction with a scanner SB in the blue printing stand. The mixer YB is electrically connected with an indicating device IB for visually exhibiting the occurrence and direction of misregister. The motor control system CB is equipped with a push button station BB whose push buttons 19 and 20 permit a manual adjustment of the web compensating roller 17 to shift the blue impression (to be printed) in the forward and reverse direction relative to the yellow imprint. A manually adjustable roller 21 leads the web toward the photo-electric scanner SB and the appertaining roller 22 of the blue printing stand in which the printing roller PB and appertaining counter roller 23 produce the blue imprint. Thence, the web passes over the drier DB to the compensating roller 24 of the black printing stand.

Roller 24 is adjusted by a reversible motor MN under control by a motor control unit CN substantially in the manner described previously with reference to roller 7. The control unit CN is governed by an electronic mixer YN which compares the impulses from the yellow scanner SY with those of a scanner SN in the black printing stand, in order to cause the motor to adjust the roller 24 for eliminating any misregister of the black imprint. A push button station BN with push buttons 26 and 27 permits the operator to shift the black imprint ahead or back relative to the web. Operated from the mixer YN is a register indicator IN. From the compensating roller 24, the web passes over a manually adjustable roller 28 along the scanner SN and the appertaining roller 29, and thence between the black printing press PN and the appertaining counter roller 30. After being dried in engagement with a heated drying cylinder DN, the web leaves the black printing stand in the direction of the arrow A2 to enter the folding equipment (not shown) of the machinery.

The printing rolls PM, PY, PR, PB and PN are suitably geared together and operated by a common drive motor (not illustrated).

The motor control units CR, CB and CN are electrically connected with a master control system CM which has a push button station BM equipped with a start button 32 and a stop button 33, in order to permit energizing and deenergizing the register regulator, respectively. The station BM has further a push button 34 which, when actuated, sets the register control for manual operation by the above-mentioned stations BR, BB and BN, while a push button 35 is provided for adjusting, when actuated, the register regulator for automatic performance.

The register marks of the yellow printing roll PY are equally spaced around the periphery of this roll so that a given number, for instance sixteen marks, are printed on the web for each revolution of the roll in a fixed position with respect to the yellow imprint on the margin of the web. By properly adjusting the compensating rolls 7, 17 and 24, and the manually adjustable rolls 14, 21 and 28, the length of the web between the printing stands can be varied to obtain an integral number of register marks along the web between each two successive scanners. The press is designed so that, with the automatic compensator rolls 7, 17 and 24 set to their mid-positions, an integral number of impressions are obtained along the web between each two printing cylinders when the manually adjustable rolls 14, 21 and 28 are adjusted to obtain an integral number of register marks along the web between the respective scanners. When these conditions obtain, the printing cylinders are positioned to print the red, blue and black impressions in register with the yellow impression. Once the machine is thus properly adjusted, the register control system functions automatically to maintain the impressions in proper register regardless of the occurrence of shrinking or other disturbances between the printing rolls. With the web moving and the printing cylinders in register, register mark images will simultaneously appear on, and disappear from, the cathodes of the photo-electric tubes located in the scanners. If this is the case, the impulses from the yellow scanner SY and, for instance, the red scanner SR, occur simultaneously in the mixer YR, so that no control stimulus is imparted to the motor control unit CR. As a result, the motor MR and the compensator roller 7 remain at rest. If the web shrinks, for instance, between the scanners SY and SR, or if the press cylinders expand and increase their mutual distance, the red and yellow impressions tend to come out of register. In this event, the electric impulses from the yellow scanner SY occur prior to the impulses from the red scanner SR. This causes the mixer YR to apply the necessary control voltages to the control unit CR which, in turn, operates the compensating motor MR in the proper direction to increase the web length between scanners SY and SR. The compensating motor MR continues to run until the web length is corrected. Over-correction will cause the electrical impulses originating in the yellow scanner SY to arrive at mixer YR later than the electrical impulses from the red scanner SR. As a result, the direction of the compensating motor MR will be reversed. Consequently, the compensating motor armature will rapidly oscillate with small angular displacements when the red and yellow impressions are in register. The occurrence of misregister causes the motor armature to temporarily assume a different ever-decreasing angular position and the correct register is obtained when the angle is substantially zero.

The blue and black impressions are independently registered with the yellow impression in a manner similar to that employed to register the red impression with the yellow impression, except that the yellow scanner SY, the blue scanner SB, the mixer YB, and the motor control CB with motor MB are employed for blue registration, and that the scanner SY with scanner SN, mixer YN, control system CN, and motor MN are effective for black registration.

The photo-electric scanner should be equipped with optical systems that are, preferably, adjustable to insure sharpest photo-electric impulses for given register marks.

Figure 2:
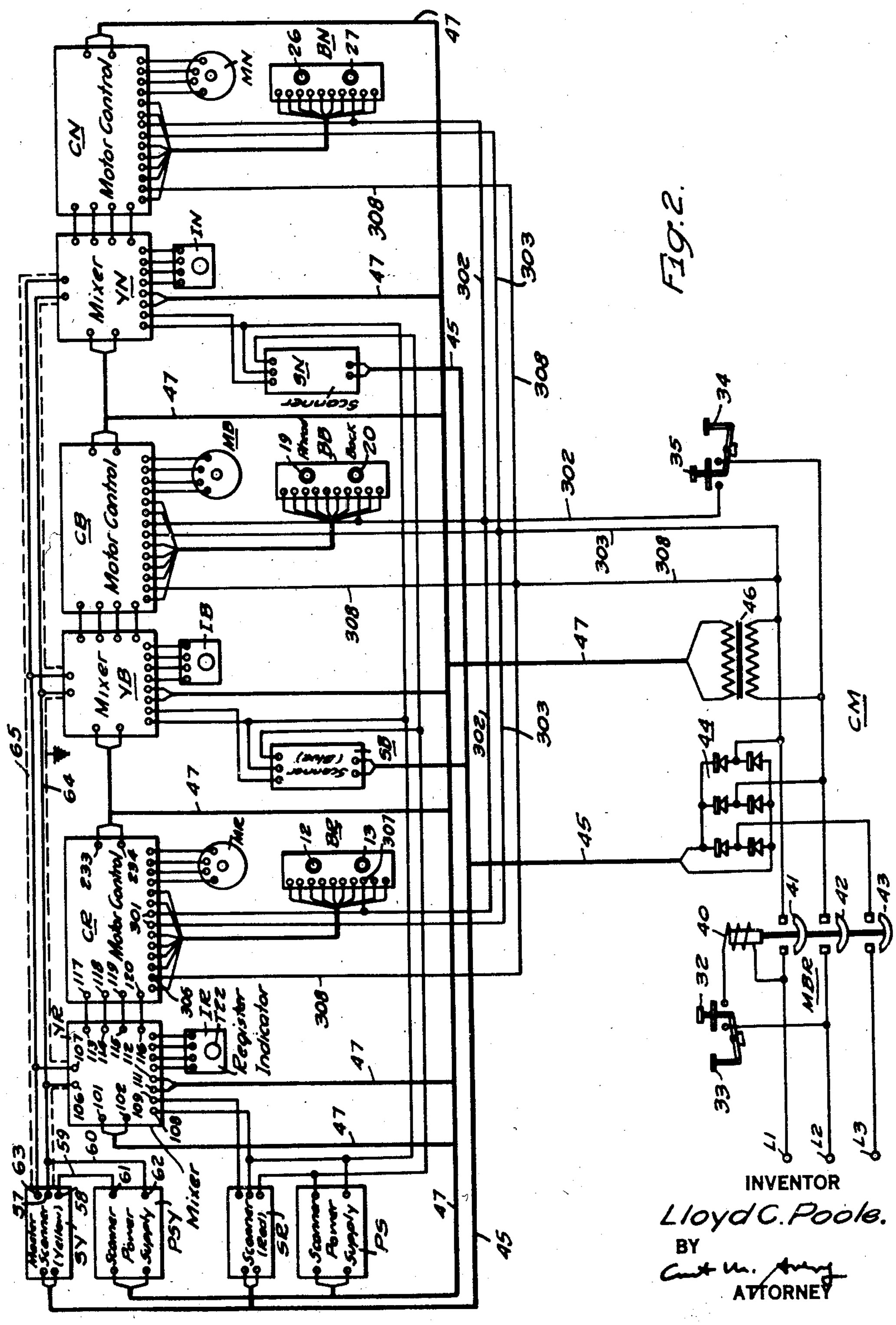
Fig. 2 represents a wiring diagram for the register control of Fig. 1.

The wiring diagram shown in Fig. 2, for the register control according to Fig. 1, is intended to represent mainly the cable and terminal connections of the various electric apparatus composing the control system. The bottom portion of Fig. 2, however, shows also details of the master control system CM with the appertaining push button station BM which will be referred to presently.

The master control system has the main power supply buses of the register control connected to terminals L1, L2 and L3 for attachment to an alternating current line. The master control system includes a main circuit breaker MBR whose coil 40 controls the power supply to the system by means of three contacts 41, 42 and 43. The contacts 41 and 43, when closed, apply energization to a full-wave rectifier 44. A branched cable 45 is connected to the output terminals of this rectifier and leads to the scanners SY, SR, SB, and SN for energizing the respective light sources of these scanners. Contacts 41 and 42 of the main breaker MB control also the energization of a power transformer 46 whose secondary winding is connected to a branched power cable 47 leading to the mixers and motor control systems of the regulator in order to supply alternating-current energization thereto. The start button 32 and the stop button 33 of the control device BM (Figs. 1, 2) control the circuit of the coil 40 in the main circuit breaker MBR and are shown in Fig. 2 to form part of a two-position switch. The buttons 34 and 35 for manual and automatic operation, respectively, of the register regulator are shown to form parts of another two-position switch. The function of the latter switch will be referred to in a later place.

The scanners of the register regulator may all have a substantially identical design. Various designs of suitable photo-electric scanners are available. Consequently, the embodiment of such a scanner, shown in Fig. 3 and described below, should be taken merely as an illustrative example and, if desired, may be replaced by known scanners of different construction.

Figure 3:
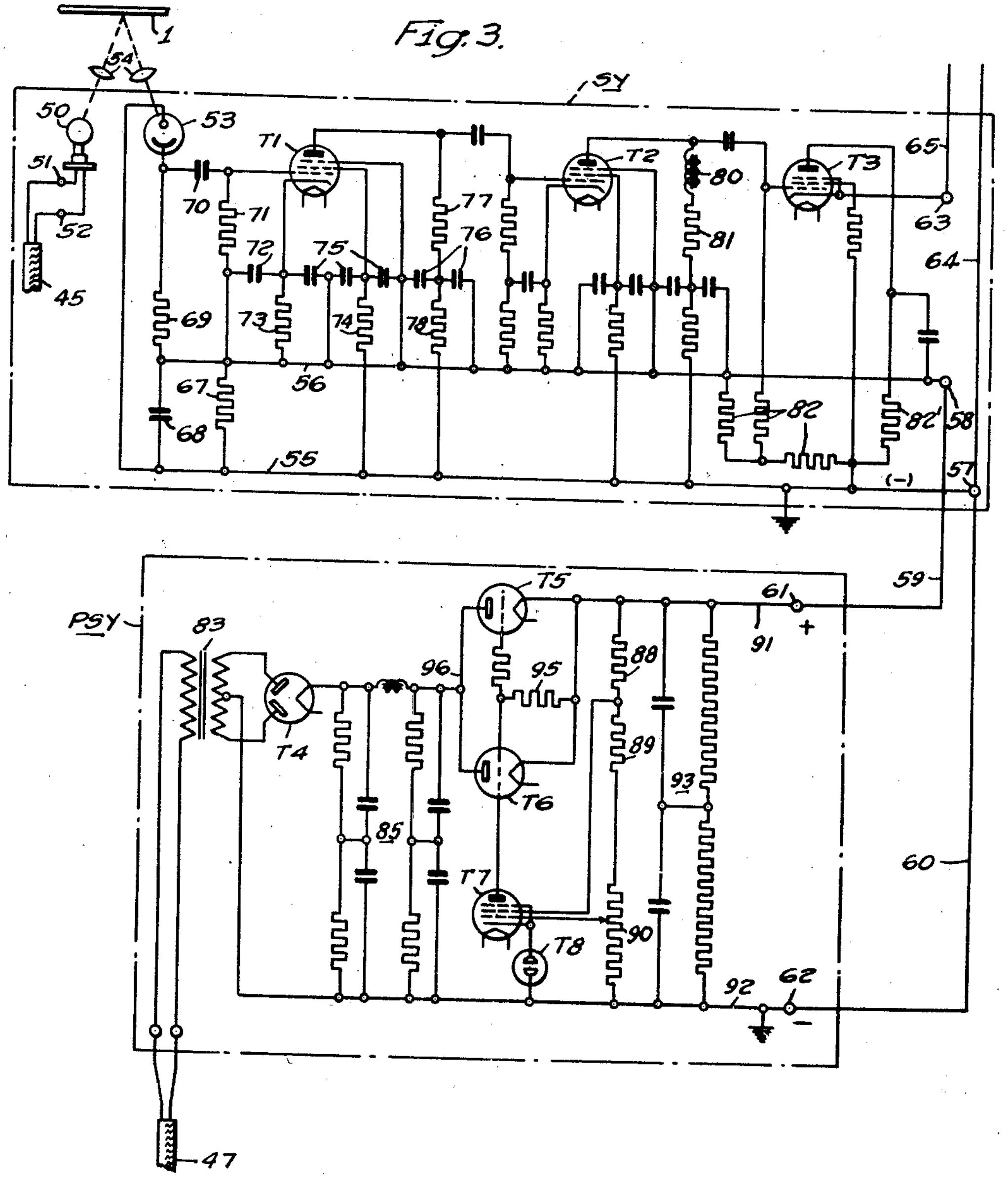
Fig. 3 (upper portion) shows, in detail, an embodiment of one of the photo-electric scanners appertaining to the register control according to Figs. 1 and 2; the same figure (lower portion) shows also the circuit diagram of a power supply unit for the scanner.

According to Fig. 3, the scanning apparatus has a light source 50 whose terminals 51 and 52 are connected to the cable 45 in order to be energized by direct current from the rectifier 44 (see Fig. 2). The photo-electric tube 53 of the scanner and the light source 50 are equipped with an optical system schematically shown at 54 (Fig. 3), so that the tube 53 is illuminated by light reflected by the traveling paper web 1. Hence, when a register mark appears at the focal spot of the optical system, the illumination of the tube cathode is changed and produces a corresponding change or impulse in the circuits associated with the tube 53. Attached to the tube circuit, is an electronic amplifier whose amplifier tubes are denoted by T1 and T2. Attached to tube T2 is a coupling circuit of cathode-follower type which includes a vacuum tube T3 whose stage gain is less than unity. The coupling circuit serves impedance matching purposes explained in a later place. The photo-tube 53 and the circuits of tubes T1, T2, T3 are energized from direct-current mains 55 and 56 whose terminals 57 and 58 are connected by respective leads 59 and 60 to the output terminals 61 and 62 of the appertaining power supply unit PSY (Figs. 2, 3), to be energized by direct current of constant voltage. The output voltage of the scanner SY in Fig. 3 appears across the terminals 57 and 63. The latter terminals are connected by respective leads 64 and 65 of a coaxial or shielded cable with the terminals 106 and 107 of the mixer YR (Figs. 2, 3). Since the scanner SY shown in Fig. 3 represents the master or "reference scanner" of the register regulator, the leads 64 and 65 are also connected to the mixers YB and YN (Fig. 2). The scanner SR of the red printing stand has its terminals, corresponding to terminals 57 and 63 of scanner SY, connected only to the mixer YR, the scanner SB of the blue printing stand has the corresponding terminals connected to the mixer YB, and the scanner SN of the black printing stand has these terminals connected to the mixer YN. In other respects the design and function of the "color scanners" SR, SB, SN may be similar to that of the reference scanner SY shown in Fig. 3.

It will thus be recognized that the photo-electric impulses from tube 53 in the reference scanner SY, upon amplification and modification in the circuits of the associated tubes T1, T2 and T3, are impressed on the mixer YR and are compared by this mixer with the amplified impulses issuing from the output terminals of the red scanner SR. Similarly, the impulses from the reference scanner SY are compared in mixers YB and YN with the impulses coming from color scanners SB and SN, respectively.

A more detailed description of the scanner SY in Fig. 3 will now be given. The direct-current voltage between the energizing mains 55 and 56 is applied to the photo-tube 53 through a resistor 67 and a capacitor 68 which serve for smoothing and filtering. The photo-tube circuit includes a load resistor 69. The voltage drop appearing across resistor 69, and the photo-electrically controlled changes of this voltage drop, are applied to the grid circuit of the first amplifier tube T1. This grid circuit includes a capacitor 70, a grid resistor 71 for obtaining the proper bias on the control grid of tube T1, and a capacitor 72. Resistor 73 serves calibrating purposes. The screen grid connections of tube T1 include a voltage dropping resistor 74 and alternating-current bypass capacitors 75. Bypass capacitors 76 for alternating current are provided in connection with the plate load resistors 77 and 78 of tube T1. The amplified output voltage across the resistor 77 is applied to the tube T2 whose circuits are similar to the above-described circuit of tube T1, except that the plate circuit of tube T2 includes a reactor 80 and a resistor 81 for improving the high-frequency response. The proper grid bias for the tube T3 is obtained from a potentiometric resistance arrangement 82, and the output from tube T3 is impressed across the above-mentioned output terminals 57 and 63 of the scanner.

With photo-tube 53 illuminated, the voltage impressed across capacitor 68 is at a maximum and equal to the voltage drop across resistor 67. The current flow through resistor 69 is zero, and the voltage applied across the grid circuit of the amplifier tube T1 is negative and equal to the normal "self" grid bias voltage. A reduction of illumination on photo-tube 53, produced by a register mark entering the focused light beam, will cause capacitor 68 to partially discharge. The discharging current, which flows through resistor 69, increases the negative voltage at the control grid or tube T1. During this transient state, the plate current of tube T1 is momentarily decreased, but returns it to normal after the register mark has passed through the light beam. As the plate current of tube T1 flows through the plate load resistor 77, the grid voltage on the control grid of tube T2 assumes a less negative value, so that the plate current of tube T2 is momentarily increased. This increases the voltage across the load elements 80 and 81 of tube T2, so that the grid voltage of tube T3 momentarily assumes an increasingly negative value. Consequently, the cathode current of tube T3 is momentarily decreased. In summary, the scanner produces a sharp negative voltage impulse between the output terminals 57, 63 and the load potentiometer RY, mentioned hereinafter with reference to Fig. 4, connected across these terminals. In other words, the potential of terminal 63 in scanner SY (Fig. 3) becomes momentarily less positive with respect to the terminal 57 which is grounded.

The power supply unit PSY shown in Fig. 3, which serves to impress constant direct-current voltage across the terminals 57 and 58 and the appertaining mains 55 and 56 of the scanner, is energized from the power transformer 46 through the cable 47 (Figs. 2, 3) and through an input transformer 83 whose secondary winding is connected to a full-wave rectifier tube T4. The output terminals of tube T4 are connected through a composite filter circuit 85 to two vacuum tubes T5 and T6 whose load consists of resistors 88, 89 and includes an adjustable potentiometer 90. These load elements are series-connected across the output leads 91 and 92 which are attached to the above-mentioned output terminals 61 and 62 of the power unit. A regulator tube T7, in connection with a non-linear circuit element consisting of a neon tube T8, serves to regulate the output current for constant voltage. An arrangement of smoothing impedances 93 is also connected across the output leads 91 and 92.

A reduction of voltage across the leads 91 and 92 caused, for instance, by a fluctuation in the alternating-current line voltage applied to the rectifier tube T4, increases the negative grid voltage in the vacuum tube T7, thus causing less current to flow through the bias resistor 95. As a result, the voltage drop across resistor 95 is also decreased and reduces the magnitude of the negative voltage applied to the grids of the vacuum tubes T5 and T6. This, in turn, decreases the voltage drop across the leads 91 and 96 and immediately restores the voltage across the leads 91 and 92. Conversely, an increase of voltage across leads 91 and 92 increases the voltage drop across leads 91 and 96 with the result of immediately restoring the voltage across the output leads 91 and 92. The magnitude of the output voltage across leads 91 and 92 may be changed or calibrated by adjusting the potentiometer 90.

The power unit PSY, shown in Fig. 3 and described in the foregoing, is similar to the power unit PS (Figs. 1, 2) for the scanners SR, SB and SN. As will be seen from the following description of the mixing units, these units are likewise equipped with a power supply section of a design similar to the one just described in conjunction with Fig. 3.

Figure 4:
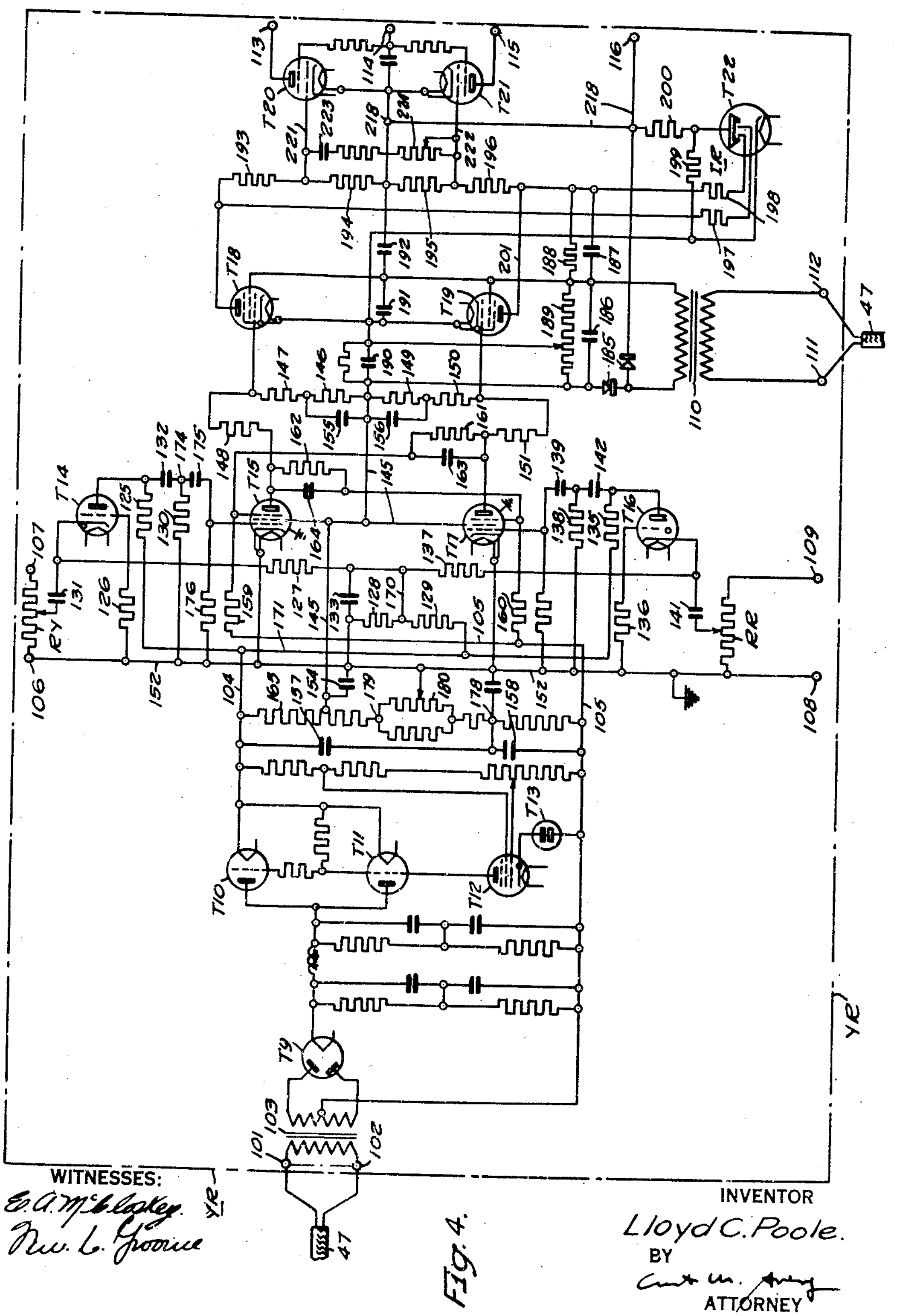
Fig. 4 represents an embodiment of one of the mixer units appertaining to the register control according to Figs. 1 and 2.

The mixer unit YR, shown in Fig. 4, comprises a direct-current power supply unit, two sharpener and associated detector circuits, two amplifiers, and a direct-current switching and delay circuit. The appertaining register indicator IR for the red printing stand is electrically associated with the amplifier stage of the mixing panel and also shown in Fig. 4.

The direct-current power unit of the mixer comprises the full-wave rectifier tube T9, two control tubes T10 and T11, regulator tube T12 and a neon tube T13. The rectifier tube T9 is energized from the terminals 101 and 102 through a transformer 103. Terminals 101 and 102 are connected to the branched power supply cable 47 (see also Fig. 2). The rectifier and regulated output voltage of the power unit is impressed across the output leads 104 (positive) and 105 (negative). The power unit, comprising the tubes T9, T10, T11, T12 and T13, is of a design and functioning similar to the power unit PSY and the respective tubes T4, T5, T6, T7 and T8, as illustrated in Fig. 3 and described in the foregoing. Hence, a detailed description and further explanation of the power unit of the mixer shown in Fig. 4 is unnecessary.

The sharpener and detector circuits of the mixer according to Fig. 4 comprise tubes T14, T15 and T16, T17, respectively. These tubes are plate-energized from the output leads 104 and 105 of the power supply unit. The grid control for the sharpener tube T14 is derived from the above-mentioned potentiometer rheostat RY whose terminals 106 and 107 are connected to the output leads 64 and 65, respectively, of the master scanner SY shown in Fig. 3 (see also Fig. 2). Therefore, the potentiometer RY shown in Fig. 4 represents the plate load for the amplifier tube T3 of the master scanner SY shown in Fig. 3.

Similarly, the grid control for the sharpener tube T16 according to Fig. 4 is derived from a potentiometer rheostat RR whose terminals 108 and 109 are connected in the plate circuit of the last amplifier stage in the red scanner SR (see Fig. 2).

Reverting to Fig. 3, the function of the pentode T3 will now be more fully explained. The master scanner and color scanners, located at the respective printing stands, are relatively remote from the mixer units, the latter being preferably arranged in a centrally located control assembly. As mentioned, the connection between the scanner and mixer is established by shielded transmission cables such as are available with concentric or twisted conductors. The impedance of cables of this sort is relatively low, for instance, in the order of 100 ohms. The impedance of the scanners, without the coupling circuit, of which the tube T3 (Fig. 3) forms part, is of a higher order, for instance several hundred thousand ohms. However, with tube T3 and the resistor 82′ series-connected across terminals 63 and 57, the output impedance between these terminals is in the order of 100 ohms and, hence, matches the input impedance of the cable (64, 65) when the cable is properly terminated at the receiving end. The resistance of the potentiometer rheostat RY (Fig. 4) at the receiving end, across terminals 106 and 107 approximates the impedance of the transmission cable. As a result of these impedance matching means at both cable ends, a faithful transmission of the scanner impulse wave shape to the mixer is achieved at the expense of the de-amplification occurring in the circuit of tube T3. The transmission between the color scanners and the respective mixers is designed and operative in a similar way thus contributing to the desired high accuracy of register control performance.

The two amplifier tubes T18 and T19 in the amplifier stage of the mixer are grid-controlled by voltages derived from the respective plate circuits of tubes T15 and T17. Plate voltage for the amplifier tubes T18 and T19 is derived by rectification from a transformer 110 whose input terminals 111 and 112 are connected to one branch of the power supply cable 47 (see also Fig. 2).

The indicator T22 of the register indicator IR is controlled in dependence upon the flow of plate current in the tubes T18 and T19 to indicate a misregister in one or the other direction.

The switching and delay circuit of the mixer includes two tubes T20 and T21. These tubes are grid-controlled by the respective tubes T18 and T19 and receive plate energization from a direct-current source which is located in the motor control unit CR and will be later described with reference to Fig. 5. The terminals denoted in Fig. 4 by 113, 114, 115 and 116, respectively, are connected with respective terminals 117, 118, 119 and 120 shown in Fig. 5 (see also Fig. 2).

The design and operation of the mixer YR according to Fig. 4 will now be described more in detail.

The first sharpener circuit of the mixer YR is composed of tube T14, resistors 125, 126, 127, 128, 129, 130 and capacitors 131, 132, 133.

The second sharpener circuit includes the tube T16, resistors 135, 136, 137, 128, 129, 130, 138 and capacitors 141, 142, 133.

These two sharpener circuits are closely associated with the respective detector tubes T15 and T17. Plate voltage, obtained from the leads 104 and 105 of the direct-current power unit of the mixer, is applied to the detector tubes T15 and T17 by means of the positive lead 145, the resistors denoted by 146 through 151, and the negative cathode lead 152. Resistors 146, 147 and 148 represent the plate load of tube T15. Resistors 149, 150 and 151 represent the plate load for tube T17. A plate and screen current bypass capacitor for both tubes is denoted by 154, while numerals 155 and 156 denote bypass capacitors for the plate load resistors of T15 and T17, respectively. Numerals 157 and 158 indicate filter capacitors.

Negative voltage is applied to the suppressor grids of tubes T15 and T17 by means of the negative lead 105 and the resistors 159 and 160. Nullifying voltage of positive polarity is applied to the suppressor grid of tube T15 through a resistor 161 connected to the plate of tube T17. Nullifying voltage of positive polarity is supplied to the suppressor grid of tube T17 through a resistor 162 connected to the plate of tube T15. Interelectrode capacitance (suppressor-plate) of tube T15 is neutralized by a capacitor 163, and interelectrode capacitance (suppressor-plate) of tube T17 is neutralized by a capacitor 164. Screen voltage for tubes T15 and T17 is supplied from a voltage dividing resistor 165 connected across the output leads 104 and 105 of the power supply unit.

Tubes T14 and T16 and their associated circuits are used to "sharpen" the impulses received from the scanners. The modified impulses are applied to the control grids of tubes T15 and T17, respectively.

Capacitor 132 is charged through resistors 125 and 130. The voltage applied to the charging circuit is obtained from lead 104 and lead 152. The time constant of the circuit has been chosen to allow capacitor 132 to charge during the elapsed time between the impulses received from scanner SY.

The control grid of T14 is connected to ground through current-limiting resistor 126 and lead 152. The cathode of T14 is connected to lead 170 through cathode resistor 127 so that resistors 128 and 129 form a voltage divider circuit across leads 152 and 171. A bias voltage for tube T14 is thus obtained across resistor 128 which is sufficient to prevent the tube from conducting, provided there is no current flowing in cathode resistor 127.

Capacitor 131, connected between the tap of rheostat RY and the cathode of tube T14, is charged, during the time elapsing between the impulses received from scanner SY, by an applied voltage which is equal to the difference of the voltages that occur on the one hand between leads 170—152 and on the other hand between the lead 152 and the tap of rheostat RY.

An impulse received from scanner SY will momentarily reduce the voltage across the lead 152 and the tap of rheostat RY, allowing the capacitor 131 to discharge through cathode resistor 127. The discharge current, which flows through resistor 127, reduces the control grid voltage of tube T14 to a value less than the critical characteristic value of tube T14 (the charging current of capacitor 131 increases the control grid voltage which produces no disturbance within the tube), and capacitor 132 discharges.

The discharge current flows from capacitor 132 through tube T14, resistor 127, capacitor 133 and resistor 130, thus making point 174 negative with respect to lead 152. The discharge continues until the algebraic sum of the voltages around the discharge circuit is equal to the arc drop of tube T14. At this point, the grid of tube T14, which has again assumed a negative value with respect to the cathode, regains control and prevents the tube from conducting. Capacitor 132 then charges, thus completing one operating cycle.

Voltage is applied rapidly across resistor 130 when tube T14 becomes conducting, which immediately charges capacitor 175 through resistor 176. As the charging current of capacitor 175 flows through resistor 176, a negative impulse (with respect to the cathode of tube T15) of very short duration, is applied to the control grid of tube T15. Positive impulses which are presented to the grid of tube T15 as capacitor 175 discharges are ineffective as tube T15 operates at zero bias.

The other sharpener circuit functions in the same manner as the sharpener circuit just discussed, except the output impulse is applied to tube T17.

The control grid bias of tubes T15 and T17 is zero. Plate voltages are supplied from lead 145 (positive) and lead 152 (negative). Negative suppressor grid voltages are supplied from lead 105 (negative) with respect to cathode lead 152. Taps 178 and 179 are positioned on resistor 165, so that for any position of potentiometer 180, the voltage applied to the suppressor grids of tubes T15 and T17 is negative with respect to the cathode lead 152. With zero control grid bias voltage on tubes T15 and T17, positive impulses do not influence the plate current of either tube T15 or tube T17. However, a negative impulse on the control grid of one tube will transfer the plate current of that tube to the other tube.

For example, a negative impulse on tube T15 control grid will interrupt the flow of plate current and the anode of T15 becomes more positive, the suppressor grid of tube T17 becomes less negative in relation to the cathode lead 152, and tube T17 will conduct more plate current. An increase of plate current of tube T17 causes its anode to assume a less positive voltage with respect to cathode lead 152 so that the suppressor grid of tube T15 becomes more negative with respect to cathode lead 152, thus maintaining the tube in a non-conducting state.

Tube T15 remains non-conducting until its negative suppressor voltage is removed by the interruption of the plate current in tube T17 due to the application of a negative impulse to its control grid. Such application of a negative impulse to the grid will transfer the current flowing in the plate circuit of tube T17 to the plate circuit of tube T15.

If negative impulses are simultaneously impressed on the control grids of tubes T15 and T17, the tubes conduct alternately; plate current transfer occurring each time the impulses are received. This condition obtains in mixer YR, when the red impression is in register with the yellow impression. The action may be more clearly understood by noting that the time constants of resistor-capacitor combinations 176, 175 and 138, 139 are less than the time constants of resistor-capacitor combinations 146, 155 and 149, 156.

For example, assume tube T17 to be conducting. Under this condition, capacitor 164 is charged to a higher voltage than is capacitor 163. When the simultaneous impulses arrive at the control grids, the suppressor grid of tube T17 will assume a greater negative potential with respect to lead 152 than will the suppressor grid of tube T15. Obviously, when the simultaneous impulses on the control grids subside, tube T15 will conduct and tube T17 will not conduct.

Tube T18 amplifies the voltage drop appearing across a portion of the plate load resistors of tube T15 i. e., the voltage across resistors 146 and 147. Likewise, tube T19 amplifies the voltage across a portion of the plate load resistors of tube T17, namely, resistors 149 and 150.

Plate, screen and grid bias voltages are supplied for tubes T18 and T19 by a voltage doubling and rectifier arrangement consisting of a transformer 110, set of rectifiers 185, capacitors 186, 187, a resistor 188 and a potentiometer rheostat 189. The grid bias voltage, which is separately filtered by capacitor 190, may be adjusted by means of the potentiometer rheostat 189. The screen grids of tubes T18, T19 are bypassed by a capacitor 191. A bypass capacitor 192 is provided for the plate load resistors 193 to 196. Numerals 197 and 198 denote current-limiting resistors for the ray control elements of externally connected tube T22 in the register indicator IR. Resistors 199 and 200 form a voltage divider which applies voltage to the target of the indicator tube T22.

With tube T15 conducting current and tube T17 not conducting current, tube T18 will receive sufficient negative bias voltage to be prevented from conducting. Tube T19 receives a minimum amount of negative grid voltage, determined by potentiometer 189, and sufficient current will flow in lead 201 and through resistor 195 to bias tube T21 to cut-off. However, as tube T18 is not conducting, the voltage drop across resistor 194 is a minimum. This minimum value of voltage, which is applied to the control grid of tube T20, is sufficiently low to allow tube T20 to conduct. For similar reasons, tube 20 is non-conductive when the conditions are such as to render tube T21 conductive.

Figure 5:
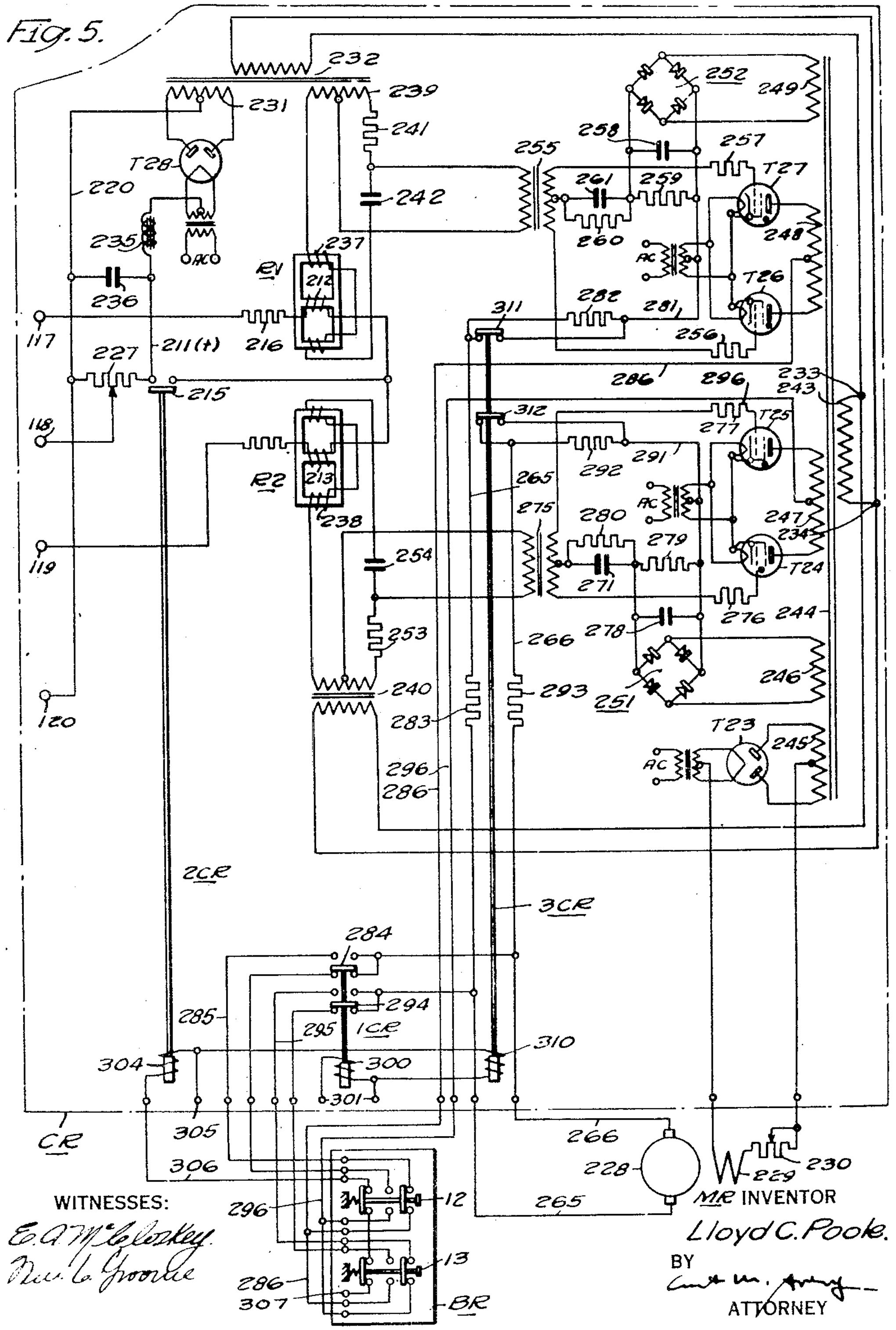
Fig 5 is an embodiment of a motor control system for one of the register control motors also appertaining to the register control of Figs. 1 and 2.

Turning for a moment to the motor control system shown in Fig. 5, and remembering that the terminals 113, 114, 115, 116 of the mixer (Fig. 4) are connected to the respective terminals 117, 118, 119, 120 of the mixing unit (Fig. 5), it will be seen that the tubes T20 and T21 (Fig. 4) operate as direct-current switches to energize and deenergize the direct-current windings 212, 213 of saturable reactors R1 and R2, respectively (Fig. 5). When the bias of tube T29 is removed, current flows from the positive lead 211 of the direct-current power source located in the motor control unit (Fig. 5) through the then closed contact 215, the direct-current coil 212 of reactor R1, resistor 216, terminal 117, terminal 113 (Fig. 4), tube T20, cathode lead 218, terminal 116, terminal 120 (Fig. 5), and lead 220 back to the negative side of the direct-current power supply of the motor control unit CR. When the bias of tube T21 is removed, current flows through the direct-current coil 213 of the reactor R2 (Fig. 5).

For large values of misregister, the voltage across leads 221 and 222 (Fig. 4) will remain constant. However, as perfect register conditions are approached, the impulses received across rheostats RY and RR from the scanners SY and SR respectively, arrive practically simultaneously. The voltage across leads 221 and 222, therefore, reverses its polarity each time a register mark enters the optical system of the yellow scanner SY. Owing to the time constants of the circuits in which the direct-current coils of reactors R1 and R2 are located, these reactors cannot be saturated and desaturated at frequencies above a frequency corresponding to about three-fourths of the speed of the press. A delay circuit, consisting of capacitor 223 and a potentiometer 224, is therefore inserted across leads 221, 222 and may be adjusted to obtain best overall results.

Target voltage for the register indicator tube T22 is obtained through the voltage divider resistors 199 and 200 connected across the direct-current source. One ray control electrode is connected through resistor 197 to the anode of tube T18. The other ray control electrode is connected through resistor 198 to the anode of tube T19.

Provided the register regulator has been synchronized with the press, the register indicator indicates the position of the yellow impression as it passes through the roll stand on which the indicator is located. Should the web shift off register, the register indicator will indicate the direction of misregister.

If the web is in advance of the "in-register" position (off-register on the left side), the impulses from the yellow scanner will be the last to arrive. Tube T15 and tube T19 do not conduct current while tubes T17 and T18 conduct. The ray control voltage for the ray control circuit attached to tube T18 will be a minimum. The other ray control voltage will be a maximum.

Under these conditions, a shadow will be cast on the left side of the register indicator tube T22 indicating that the web is off-register to the left side. Similarly, if the web is off-register to the right, a shadow will be cast on the right side of the register indicator tube.

When the web is in-register, light will be cast over each shadow area of the indicator tube each time a register mark passes the yellow scanner. Due to persistance of vision, the two shadow areas of the register tube will then appear to be equally illuminated.

The motor control system CR, shown in detail in Fig. 5, serves to govern the regulating performance of the reversible motor MR for the red printing stand. This motor is also shown in Fig. 5, its armature is denoted by 228, its field winding by 229 and an appertaining field rheostat by 230. Fig. 5 shows also the push button station BR appertaining to the motor control unit CR of the red printing stand.

According to Fig. 5, the motor control unit CR includes three electromagnetic relays 1CR, 2CR and 3CR. These relays are controlled by the master push button station BM (Fig. 1) and, more particularly, by the appertaining switch containing the push buttons 34 and 35 (Fig. 2), and these relays are also under control by the push buttons 12 and 13 of the push button station BR (Fig. 5) of the red printing stand. This will be set forth more in detail in a later place.

The motor control unit CR according to Fig. 5 is provided with two full-wave rectifier tubes T23 and T28 of which the tube T23 provides exciting voltage for the motor field winding 29. The unit CR includes also two pairs of thyratron tubes denoted by T24, T25, and T26, T27, respectively.

The rectifier tube T28 forms part of the direct-current power supply source for the direct-current control coils 212 and 213 of the saturable reactors R1 and R2, these coils being controlled by the switching tubes T20 and T21, respectively, of the mixer panel (Fig. 4). The anodes of tube T28 (Fig. 5) are connected to the mid-tapped secondary winding 231 of a transformer 232 whose primary is energized from the power terminals 233 and 234 of the control unit. Terminals 233 and 234 are connected to one branch of the power supply cable 47 (see Fig. 2) and hence receive energization when the main circuit breaker MB is closed. The current rectified by tube T28 (Fig. 5) is filtered by a reactor 235, a capacitor 236 and a resistor 227.

The reactors R1 and R2 have respective alternating-current coils 237 and 238 whose reactance is high when the appertaining magnetic reactor core is unsaturated, but drops to a low value when the core is saturated by the excitation of the appertaining control coil 212 or 213. The alternating-current winding 237 of reactor R1 is connected to another secondary 239 of transformer 232. The alternating-current coil of reactor R2 is connected to a transformer 240 which receives primary energization from the power supply terminals 233 and 234. The connection of winding 239 with coil 237 includes a resistor 241 and a capacitor 242; and a similar resistor 253 and capacitor 254 are connected with the circuit of coil 238 of reactor R2.

Coil 237 of reactor R1, resistor 241 and capacitor 242 are elements of a phase shift circuit whose output voltage is applied to a transformer 255 The reactor winding 238 with resistor 253 and capacitor 254 forms another phase shift circuit which is output-connected to a transformer 275.

Connected across the power terminals 233 and 234 of the motor control unit CR (Fig. 5), is also the primary winding 243 of a transformer 244 which has five secondary windings denoted by 245 through 249.

The grid voltages of tubes T26 and T27 have an alternating-current component and a direct-current component. The alternating-current component of the grid voltage for tube T26 is displaced 180 electrical degrees with respect to the alternating component of the grid voltage for tube T27 and is supplied from the secondary winding of transformer 255 through a current-limiting resistor 256. The alternating-current component of the grid voltage for tube T27 is supplied from the same transformer 255 through a current-limiting resistor 257.

The direct-current bias voltage applied to the grids of tubes T26 and T27 is obtained from two sources operative in series with each other. One of these sources comprises a full-wave rectifier 252 energized from the secondary winding 249 of the transformer 244. A capacitor 258 and a resistor 259 are connected in parallel to each other across the output terminals of the rectifier 252. The other source of direct-current grid bias comprises the secondary winding of transformer 255, the current-limiting resistors 256 and 257, a resistor 260, a capacitor 261, and the tubes T26 and T27. Both sources deliver an adequately filtered, full-wave rectified current. Similar capacitors, resistors and appertaining elements are employed in connection with the thyratron tubes T24 and T25.

As stated above, reactors R1 and R2 (Fig. 6) are controlled by tubes T20 and T21 (Fig. 5), respectively. With no current flowing in tube T21, saturable reactor R2 is desaturated. Consequently, a phase shifted alternating-current grid voltage is applied to the control grid and cathode of thyratron tube T27. A similar control grid voltage, except displaced 180 electrical degrees, is applied to the control grid and cathode of thyratron tube T26.

The direct-current grid bias voltage which is applied to the control grids of thyratron tubes T26 and T27 is the sum of the voltage drops across resistors 259 and 260. The voltage across resistor 259 is obtained from rectifier 252. The voltage across resistor 260 is obtained from the full-wave rectifier circuit consisting of transformer 255, grid and cathode elements of tubes T26 and T27 and capacitor 261.

The direct-current grid bias voltage is approximately equal to the maximum value of the alternating-current component of the grid voltage applied to tube T26 from transformer 255, minus the grid to cathode arc drop in thyratron tube T26. Consequently, the voltage across the filter, comprised of capacitor 261 and resistor 260, will change with any changes in line voltage and the direct-current grid bias voltage will remain at a constant value.

When reactor R1 is desaturated, the alternating-current component of the grid voltage of thyratron tube T27 leads the anode voltage by 60 electrical degrees, allowing the instantaneous grid voltage to exceed the critical grid characteristic at the start of the cycle. Tube T27 then conducts current every half-cycle. Similar conditions obtain for thyratron tube T26 during the following half-cycle.

When reactor R1 is saturated, the alternating-current grid voltages applied to thyratron tubes T26 and T27 lead the corresponding anode voltages of the tubes by 150 electrical degrees. With positive anode voltage on either tube, the instantaneous value of the grid voltage exceeds the critical grid characteristic and the tubes cannot conduct.

Reactor R2, transformer 275 and associated resistors 276, 277, 279, 280, 200, capacitors 271, 278, and rectifier 251 control the thyratron tubes T24 and T25 in a manner similar to that of the corresponding circuit elements described above for thyratron tubes T26 and T27.

From the above description, it will be recognized that the motor armature is operated in one direction by saturating the reactor R2 and desaturating the reactor R1. The armature current then flows from the cathodes of thyratron tubes T26 and T27 through lead 281, resistor 282, lead 265, resistor 283, to the positive side of the armature 228, through the armature, lead 266, close contacts 284 of 1CR, lead 285 and a contact of push button 12 to lead 286 of the transformer winding 248, where the current divides. One half of the current flows through the transformer winding to the anode of tube T27 to cathode lead 281. The remaining half of the current flows through the transformer winding to the anode of tube T26 to cathode lead 281. Current will not flow from thyratron tubes T24 and T25 because reactor R2 is saturated.

By saturating reactor R1 and desaturating reactor R2, the motor will operate in the opposite direction. Current then flows from tubes T24 and T25 through lead 291, resistor 292, resistor 293 to the positive side of the armature 228 (lead 265); thence through the armature, lead 265, closed contact 294 of relay 1CR, lead 295, push button 13, lead 296, and back through supply transformer winding 247 and tubes T24 and T25.

It is assumed, in the foregoing description of the control performance, that the relays 1CR, 2CR and 3CR of the motor control unit CR (Fig 5) are in energized, picked-up condition. That this is the case when the system is set for automatic operation, will be recognized from the following.

The control coil 300 of relay 1CR is connected across the terminals 301 of the control unit CR. Terminals 301, as illustrated in Fig. 2, are connected by leads 302 and 303 with the corresponding relay terminals of the motor control units CB and CN and also the line terminals L1 and L2 under control by the contacts 41 and 42 of the main circuit breaker MB, and also under control by the push button 35 of the switch appertaining to the master push button station. Hence, when the breaker MBR is closed by actuation of the start contact 32, and if the system is set for automatic performance by the actuation of the push button 35, the coil 300 of relay 1CR (Fig. 5) is energized and the relay contacts 284 and 294 complete the circuits of the leads 285 and 295, as described in the foregoing.

The control coil 304 of relay 2CR is connected across two terminals of the control unit CR of which one is denoted by 305. The other terminal is connected through a lead 306 and the push button contacts 12, 13 to a terminal 307 of the push button station BR at the red printing stand. Terminal 307 of station BR, as shown in Fig. 2, is connected to the above-mentioned lead 302, and hence through the automatic push button contact 35 and the main breaker contact 42 to the line terminal L2. Terminal 305 (Fig. 5) of control unit CR is connected by a lead 308 (Fig. 2) to the corresponding terminals of the motor control units CB and CN, and also with the line terminal L1 through the main breaker contact 41. Hence, coil 304 of relay 2CR (Fig. 5) operates in parallel connection to the coil 300 of relay 1CR and closes the contact 215 during the automatic performance. The coil 310 of relay 3CR is likewise connected in parallel to the coil 300 as is apparent from Fig. 5. Therefore, the relay 3CR opens its contacts 311 and 312 as is required for the above-described automatic regulating functions.

By operating the manual push button 34 (Fig. 2), the contacts of relays 1CR and 3CR are returned to their normal positions as shown in Fig. 5. When operating the push button 12 or 13 (Fig. 6), relay 2CR returns to normal open contact position and deenergizes reactors R1 and R2, thus delaying the phase of the grid voltages of thyratron tubes T24, T25, T26, T27.

Operation of the push button 12 (Fig. 5) closes the anode circuits of tubes T24 and T25, and voltage is applied to the motor armature 228 through lead 266 (positive) and lead 265 (negative). Operation of the push button 13 closes the anode circuits of tubes T26 and T27, and voltage is applied to the motor armature through lead 266 (positive) and lead 265 (negative).

While a description of the regulator performance as a whole has been given above, the following characteristics of the system will now be readily apparent.

A regulator control according to the invention requires not more photo-electric scanners and associated tube circuits than there are color presses. For instance, for the illustrated four-color press, only one reference or master scanner at the first (yellow) color press and only three color scanners at the red, blue, and black presses, respectively, are required. This distinguishes a regulator according to the invention favorably from known regulator systems in which one scanner was located ahead of each color press and one immediately behind the press, thus requiring at least seven scanners for a four-color printing method.

The association of sharpener circuits (including the tubes T14 and T16 in Fig. 4) with the detector circuits of the mixers permits operating with extremely short impulses from the photo-electric scanners. For instance, the illustrated system may operate with impulses from the scanners of not more than 10 microseconds duration. As a result, the system is further distinguished by an extremely high accuracy of performance.

In conjunction therewith, the automatic compensation of line fluctuations effected, for instance, by the tubes T12, T13 in Fig. 5, and tubes T4, T8 in Fig. 3, maintains the high accuracy of registering performance independent of disturbing voltage variations in the energizing alternating-current line.

Regulators according to the invention are further advantageous in affording an easy and rapid manual adjustment of the press, for instance, when starting the printing and placing the machinery in the required initial register. This operation is greatly facilitated by the above-described presence of the register indicators including the tube T22 and its circuit connections with the mixers (see Fig. 4).

It will also be noted that, when the regulator is set for manual operation, the relay 2CR (Fig. 5) is in the illustrated deenergized condition, and hence places the resistors 282 and 292 into the armature circuit. This has the effect of recalibrating the motor control unit for an increased motor speed during manual actuation. As a result, the regulator permits the elimination of excessive misregister within very short time.

It will be understood by those skilled in the art that the invention permits of various modifications and alterations, especially as regards the individual apparatus units that compose the system, without departing from the objects and essential features of the invention and within the scope of the claims defining the invention hereinafter.

I claim as my invention:

1. A register regulator for registering imprints in multi-color printing, comprising a plurality of register control motors for registering respective subsequent imprints with the first imprint, a plurality of control units connected to said respective motors and having each a pair of control circuits for causing the appertaining motor to run in a direction depending upon which of said circuits is energized, an impulse-transmitting master scanner for issuing master impulses in response to the passage of register marks of the first imprint, a plurality of impulse-transmitting reference scanners to be located ahead of the respective subsequent imprints for issuing reference impulses in response to the passage of said register marks, a plurality of electronic mixer units each being connected to said master scanner and to one of said respective reference scanners to be controlled by said master impulses and said reference impulses and having two output circuits connected to said respective control circuits of one of said respective motor control units for energizing one or the other of said two circuits depending upon whether said master impulses lead or lag said reference impulses, whereby the motor appertaining to said one control unit is caused to run in the direction required to establish simultaneity of said impulses.

2. A register regulator for registering imprints in multi-color printing, comprising an impulse-transmitting master scanner for issuing master impulses in response to the passage of register marks of the first imprint, a plurality of impulse-transmitting reference scanners to be located ahead of the respective subsequent imprints for issuing reference impulses in response to the passage of said register marks, a plurality of electronic mixer units each being connected to said master scanner and to one of said respective reference scanners to be controlled by said master impulses and said reference impulses and having two output circuits, an electronic register indicator tube for visual indication having two deflector electrodes connected to said respective output circuits so as to deflect its indication either way depending upon whether said master impulses lead or lag said reference impulses, a plurality of register control motors for registering respective subsequent imprints with the first imprint, and controllable reversing means for said motor in order to make it run in the direction exhibited by said indicator tube for establishing simultaneity of said impulses.

3. A register regulator for registering imprints in multi-color printing, comprising a plurality of register control motors for registering respective subsequent imprints with the first imprint, a plurality of control units connected to said respective motors and having each a pair of control circuits for causing the appertaining motor to run in a direction depending upon which of said circuits is energized, an impulse-transmitting master scanner for issuing master impulses in response to the passage of register marks of the first imprint, a plurality of impulse-transmitting reference scanners to be located ahead of the respective subsequent imprints for issuing reference impulses in response to the passage of said register marks, a plurality of electronic mixer units each being connected to said master scanner and to one of said respective reference scanners to be controlled by said master impulses and said reference impulses and having two output circuits connected to said respective control circuits of one of said respective motor control units for energizing one or the other of said two circuits depending upon whether said master impulses lead or lag said reference impulses, so that the motor appertaining to said one control unit is caused to run in the direction required to establish simultaneity of said impulses, and an electronic indicator tube for visual indication having two deflector electrodes connected to said respective output circuits so as to deflect its indication to thereby exhibit the direction of any misregistry.

4. A register regulator for registering imprints in multi-color printing, comprising a plurality of register control motors for registering respective subsequent imprints with the first imprint, a plurality of control units connected to said respective motors and having each a pair of control circuits for causing the appertaining motor to run in a direction depending upon which of said circuits is energized, an impulse-transmitting master scanner for issuing master impulses in response to the passage of register marks of the first imprint, a plurality of impulse-transmitting reference scanners to be located ahead of the respective subsequent imprints for issuing reference impulses in response to the passage of said register marks, a plurality of electronic mixer units each being connected to said master scanner and to one of said respective reference scanners to be controlled by said master impulses and said reference impulses and having two output circuits connected to said respective control circuits of one of said respective motor control units for energizing one or the other of said two circuits depending upon whether said master impulses lead or lag said reference impulses so that the motor appertaining to said one control unit is caused to run in the direction required to establish simultaneity of said impulses, a plurality of manually controllable means associated with said respective motors and having selective actuating means for permitting each motor to be individually operated in either direction under control by the operator, and selective master control means common to said motors and interlocked with said plurality of manually controllable means so as to permit the operator to set the regulator for manual control of said motors and for automatic control by said control units respectively.

5. A register regulator for registering imprints in multi-color printing, comprising a plurality of register control motors for registering respective subsequent imprints with the first imprint, a plurality of control units connected to said respective motors and having each a pair of control circuits for causing the appertaining motor to run in a direction depending upon which of said circuits is energized, an impulse-transmitting master scanner for issuing master impulses in response to the passage of register marks of the first imprint, a plurality of impulse-transmitting reference scanners to be located ahead of the respective subsequent imprints for issuing reference impulses in response to the passage of said register marks, a plurality of electronic mixer units each being connected to said master scanner and to one of said respective reference scanners to be controlled by said master impulses and said reference impulses and having two output circuits connected to said respective control circuits of one of said respective motor control units for energizing one or the other of said two circuits depending upon whether said master impulses lead or lag said reference impulses so that the motor appertaining to said one control unit is caused to run in the direction required to establish simultaneity of said impulses, a plurality of manually controllable means associated with said respective motors and having selective actuating means for permitting each motor to be individually operated in either direction under control by the operator in accordance with the indication of said indicator tube, and selective master control means common to said motors and interlocked with said plurality of manually controllable means so as to permit the operator to set the regulator for manual control of said motors and for automatic control by said control units respectively.

6. A register regulator for registering imprints in multi-color printing, comprising a plurality of reversible register control motors for registering said imprints relative to one another, a plurality of control units connected to said respective motors and having each a pair of control circuits for causing the appertaining motor to run in a direction depending upon which of said circuits is energized, a plurality of impulse-transmitting photo-electric scanners for issuing control impulses in response to the passage of printed register marks, a plurality of electronic mixer units each being input-connected to two of said scanners to be jointly controlled by the impulses from said two scanners and being output-connected to one of said control units respectively for energizing one or the other of said two circuits depending upon whether the impulses from one of said two scanners lead or lag those from said other scanner, an electronic indicator tube for visual indication having two deflector electrodes connected to said respective output circuits so as to deflect its indication in accordance with the direction of misregister.

7. A register regulator for registering imprints in multi-color printing, comprising a plurality of reversible register control motors for registering said imprints relative to one another, a plurality of control units each having two thyratron tubes connected to one of said respective motors for energizing it to run in one or the other direction depending upon which of said tubes is conductive at a time, grid circuits associated with said respective tubes, circuits for controlling the latter, biasing means in each grid circuit for imposing thereon a direct-current bias voltage, an alternating-current circuit connected with each grid circuit for imposing thereon an alternating grid voltage and comprising controllable phase-shift means for rendering said tubes conductive and nonconductive; a plurality of impulse-transmitting photo-electric scanners for issuing control impulses in response to the passage of printed register marks, a plurality of electronic mixer units each being input-connected to two of said scanners to be jointly controlled by the impulses from said two scanners and being output-connected to phase-shift means appertaining to said two tubes of one of said control units respectively for causing said phase-shift means to render one or the other of said tubes conductive depending upon whether the impulses from one of said two scanners lead or lag those from said other scanner.

8. A register regulator for registering imprints in multi-color printing, comprising a plurality of reversible register control motors for registering said imprints relative to one another, a plurality of control units each having two thyratron tubes connected to one of said respective motors for energizing it to run in one or the other direction depending upon which of said tubes is conductive at a time, grid circuits associated with said respective tubes, circuits for controlling the latter, biasing means in each grid circuit for imposing thereon a direct-current bias voltage, an alternating-current circuit connected with each grid circuit for imposing thereon an alternating grid voltage and comprising controllable phase-shift means for rendering said tubes conductive and nonconductive; energizing means disposed for connection to an alternating-current line and connected with said tubes to provide plate-energization therefor and also connected with said biasing means so as to vary said bias voltage in response to fluctuations in line voltage in order to compensate the effect of such fluctuations on the control of said tubes; a plurality of impulse-transmitting photo-electric scanners for issuing control impulses in response to the passage of printed register marks, a plurality of electronic mixer units each being input-connected to two of said scanners to be jointly controlled by the impulses from said two scanners and being output-connected to said phase-shift means appertaining to said two tubes of one of said control units respectively for causing said phase-shift means to render one or the other of said tubes conductive depending upon whether the impulses from one of said two scanners lead or lag those from said other scanner.

9. A register regulator for registering imprints in multi-color printing, comprising a plurality of reversible register control motors for registering said imprints relative to one another, a plurality of control units each having two rectifier circuits each containing two thyratron tubes interconnected for full-wave rectification, said rectifier circuits being connected to one of said respective motors for energizing it to run in one or the other direction depending upon which of said rectifier circuits is conductive at a time, each of said rectifier circuits having grid circuits associated with the appertaining two tubes for controlling the latter; said two tubes of each rectifier circuit having plate circuits provided with common alternating-current energizing means for attachment to an alternating-current line, biasing means disposed in said respective grid circuits for imposing a direct-current bias thereon, alternating-current circuits connected with said respective grid circuits for imposing thereon an alternating grid voltage and comprising controllable phase-shift means for rendering said tubes conductive and non-conductive, said plate circuits of each rectifier circuit having a common direct-current branch connected to said biasing means of the appertaining grid circuits so as to vary said direct-current bias in response to fluctuations in line voltage in order to compensate the effect of such fluctuations relative to the control of said tubes, a plurality of impulse-transmitting photo-electric scanners for issuing control impulses in response to the passage of printed register marks, a plurality of electronic mixer units each being input-connected to two of said scanners to be jointly controlled by the impulses from said two scanners and being output-connected to said phase-shift means appertaining to said two tubes of one of said control units respectively for causing said phase-shift means to render one or the other of said tubes conductive depending upon whether the impulses from one of said two scanners lead or lag those from said other scanner.

10. A register regulator for registering imprints in multi-color printing, comprising a plurality of reversible register control motors for registering said imprints relative to one another, a plurality of control units each having two thyratron tubes connected to one of said respective motors for energizing it to run in one or the other direction depending upon which of said tubes is conductive at a time, grid circuits associated with said respective tubes, circuits for controlling the latter, biasing means in each grid circuit for imposing thereon a direct-current bias voltage, an alternating-current circuit connected with each grid circuit for imposing thereon an alternating grid voltage and comprising controllable phase-shift means for rendering said tubes conductive and non-conductive; energizing means disposed for connection to an alternating-current line and connected with said tubes to provide plate-energization therefor and also connected with said biasing means so as to vary said bias voltage in response to fluctuations in line voltage in order to compensate the effect of such fluctuations on the control of said tubes; a plurality of impulse-transmitting photo-electric scanners for issuing control impulses in response to the passage of printed register marks, a plurality of electronic mixer units each having two detector tubes associated with two switching tubes, said detector tubes being grid-connected to two of said scanners to be controlled by the impulses from said latter scanners respectively and being plate-connected to said respective switching tubes to control the latter for conductance and non-conductance, means connected to said detector tubes to provide direct-current grid bias therefor and being designed for attachment to an alternating-current line and provided with regulating means for compensating the effect of line voltage fluctuations relative to the control performance of said detector tubes, said switching tubes being connected to said respective phase-shift means for causing them to render one or the other of said thyratron tubes conductive depending upon whether the impulses from one of said two scanners lead or lag those from said other scanner.

11. In combination with a multi-color printing press having a plurality of successive printing stands for producing respective differently colored imprints on a web and having means for passing the web successively through said stands, a register control system comprising a photo-electric master scanner located at the first stand behind the first imprint for issuing recurrent master impulses in response to register marks of the first imprint, a plurality of photo-electric reference scanners located at the other stands respectively ahead of the respective other imprints for issuing reference impulses in response to said register marks, a plurality of reversible regulator motors, a plurality of movable compensating devices mechanically connected to and controlled by said respective motors for varying the length of the web portions extending between each two successive stands, and a plurality of electronic control devices connected to said respective motors for controlling them to maintain said imprints in register, each of said control devices having two input circuits connected to said master scanner and one of said respective reference scanners to be controlled in response to departure of said reference impulses from a given time relation to said master impulses.

12. A register regulator for registering the color imprints of a multi-color print under control by register marks of the first printed imprint, comprising a plurality of register control means for displacing the subsequently printed prints respectively with respect to the first printed imprint, each of said register control means including a reversible motor and an electronic mixer unit, said mixer unit having two mutually interlocked trigger tubes for alternate operation and having two respective grid circuits for causing said tubes to control said motor in dependence upon the departure of two series of impulses, applied to said respective grid circuits, from a given time relation to each other, a photo-electric master scanner located between the printing places of the first and second imprints respectively for issuing one of said series of impulses in a fixed phase relation to the printing of the first imprint, a plurality of photo-electric "color" scanners located near the printing places of the respective subsequently printed impressions for issuing respective other series of impulses in response to the passage of the register marks, a first cable connection disposed between said master scanner and one of said grid circuits of each of said mixer units, a group of cable connections disposed between said respective "color" scanners and said other grid circuits of said respective mixer units, step-down impedance matching means interposed between each of said scanners and the appertaining cable connection, and step-up impedance matching means interposed between each of said cable connections and the respective grid circuits.

13. A register regulator as set forth in claim 12, in which said impedance matching means of said scanners comprise an electronic vacuum tube and an impedance connected in series-relation to each other across the cable connection attached to the scanner, said tube being connected to the appertaining scanner so as to have a stage gain of less than unity.

LLOYD C. POOLE.

REFERENCES CITED

The following references are of record in the file of this patent:

UNITED STATES PATENTS

| Number | Name | Date |
|---|---|---|
| 2,230,715 | Cockrell | Feb. 4, 1941 |
| 2,396,706 | Kott | Mar. 19, 1946 |

FOREIGN PATENTS

| Number | Country | Date |
|---|---|---|
| 530,314 | Great Britain | Dec. 10, 1940 |